(12) United States Patent
Cooreman

(10) Patent No.: US 6,839,840 B1
(45) Date of Patent: Jan. 4, 2005

(54) AUTHENTICATING METHOD BETWEEN A SMART CARD AND A TERMINAL

(75) Inventor: Pascal Cooreman, Marseilles (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/831,634

(22) PCT Filed: Nov. 4, 1999

(86) PCT No.: PCT/FR99/02692

§ 371 (c)(1),
(2), (4) Date: May 11, 2001

(87) PCT Pub. No.: WO00/30048

PCT Pub. Date: May 25, 2000

(30) Foreign Application Priority Data

Nov. 12, 1998 (FR) .......................................... 98 14224

(51) Int. Cl.[7] .............................................. G06F 01/24
(52) U.S. Cl. ...................... 713/172; 713/182; 713/185; 713/193; 713/200; 713/201
(58) Field of Search ................................ 713/172, 182, 713/185, 193, 200, 201

(56) References Cited

FOREIGN PATENT DOCUMENTS

| EP | 0216298 A2 | 4/1987 |
| EP | 0423035 A1 | 4/1991 |
| FR | 2600188 | 12/1987 |
| FR | 2685520 | 6/1993 |
| WO | WO96/24913 | 8/1996 |

*Primary Examiner*—Thomas R. Peeso
(74) *Attorney, Agent, or Firm*—Burns, Doane, Swecker & Mathis, L.L.P.

(57) ABSTRACT

The invention concerns a method enabling a smart card and a terminal whereto it is connected to authenticate each other. The invention is characterized in that at the end of each transaction the terminal calculates, from data representing the card at said transaction end, a secret code $CSC_2$ which is recorded in a zone ZCSC with unprotected access in the card memory and an authentication certificate $CA_2$ which is recorded in a zone ZCA with protected access of the memory by presenting a secret code $CSC_2$. At the next transaction, the terminal calculates, by means of data contained in the card, a secret code and an authentication certificate which are compared to those previously recorded to perform authentication. The invention is applicable to smart cards.

15 Claims, 2 Drawing Sheets

AUTHENTICATING METHOD BETWEEN A SMART CARD AND A TERMINAL

This disclosure is based upon, and claims priority from French Application No. 98/14224, filed on Nov. 12, 1998 and International Application No. PCT/FR99/02692, filed Nov. 4, 1999, which was published on May 25, 2000 in a language other than English, the contents of which are incorporated herein by reference.

BACKGROUND OF THE INVENTION

The invention concerns memory chip cards and the terminals to which they are capable of being connected from time to time and, more particularly, a method which enables the memory chip card and the terminal to authenticate one another.

Memory chip cards, on account of their not having a microprocessor, cannot use an authentication algorithm which involves calculations. However, certain memory chip cards use an algorithm in hard-wired form which allows the so-called "active" authentication of the card by the terminal but not the reverse authentication of the terminal by the card. Owing to their low cost, memory chip cards are used a great deal in many applications such as loyalty cards, access control, charge card payments, etc. However, owing to the lack of authentication, their security in use is vulnerable so that microprocessor cards are sometimes preferred to them for certain applications. But these microprocessor cards have a distinctly higher cost, which becomes increasingly higher as the authentication algorithm becomes more developed, which leads to them being ruled out for inexpensive applications. Also, the aim of the present invention is to obtain security in use of memory chip cards.

This aim is achieved by using an authentication method in which all the algorithmic calculations are performed by the terminal to which the memory chip card is connected.

Furthermore, the operations relating to authentication are performed before the start of a transaction proper and after the end of this transaction with a view to the authentication at the start of the following transaction.

SUMMARY OF THE INVENTION

The invention therefore concerns an authenticating method between a memory chip card having at least one counter and a terminal, characterised in that it comprises the following steps consisting of:

(a) inserting the memory chip card into the terminal, (b) calculating, in the terminal, a secret code $CSC_1$, according to a cryptographic function F of a number of variables comprising at least a code CSN identifying the memory chip card and the value of said counter, (c) authenticating the terminal by the card when the calculated secret code $CSC_1$ is identical to a code $CSC_0$ recorded in the memory at the end of the previous authentication according to the operation (f) below, (d) carrying out the planned transaction and modifying the value of said counter, (e) calculating, in the terminal, a new secret code $CSC_2$ according to the cryptographic function F of the code CSN identifying the memory chip card and the new value of said counter, (f) updating the memory chip card for the next transaction by recording, in the memory, the new secret code $CSC_2$ calculated by the operation (e).

In order to obtain authentication of the card by the terminal, the method comprises the following supplementary steps between the steps (c) and (d) consisting of:

(x) calculating, in the terminal, an authentication certificate $CA_1$ according to a cryptographic function G of a number of variables comprising at least the code CSN identifying the memory chip card and the value of said counter, (y) authenticating the card by the terminal when the calculated authentication certificate $CA_1$ is identical to a certificate $CA_0$ calculated and recorded in the card at the end of the previous transaction according to the steps (e') and (f') below:

in that the step (e) is supplemented by the following step consisting of:

(e') calculating, in the terminal, a new authentication certificate $CA_2$ according to the cryptographic function G, and in that the step (f) is supplemented by the following step consisting of:

(f') updating the memory chip card for the next transaction by recording, in the memory, the new authentication certificate $CA_2$ calculated according to the step (e').

BRIEF DESCRIPTION OF THE DRAWINGS

Other characteristics and advantages, of the present invention will emerge from a reading of the following description of a particular embodiment, said description being given with reference to the accompanying drawing in which.

DETAILED DESCRIPTION

Figure 1:
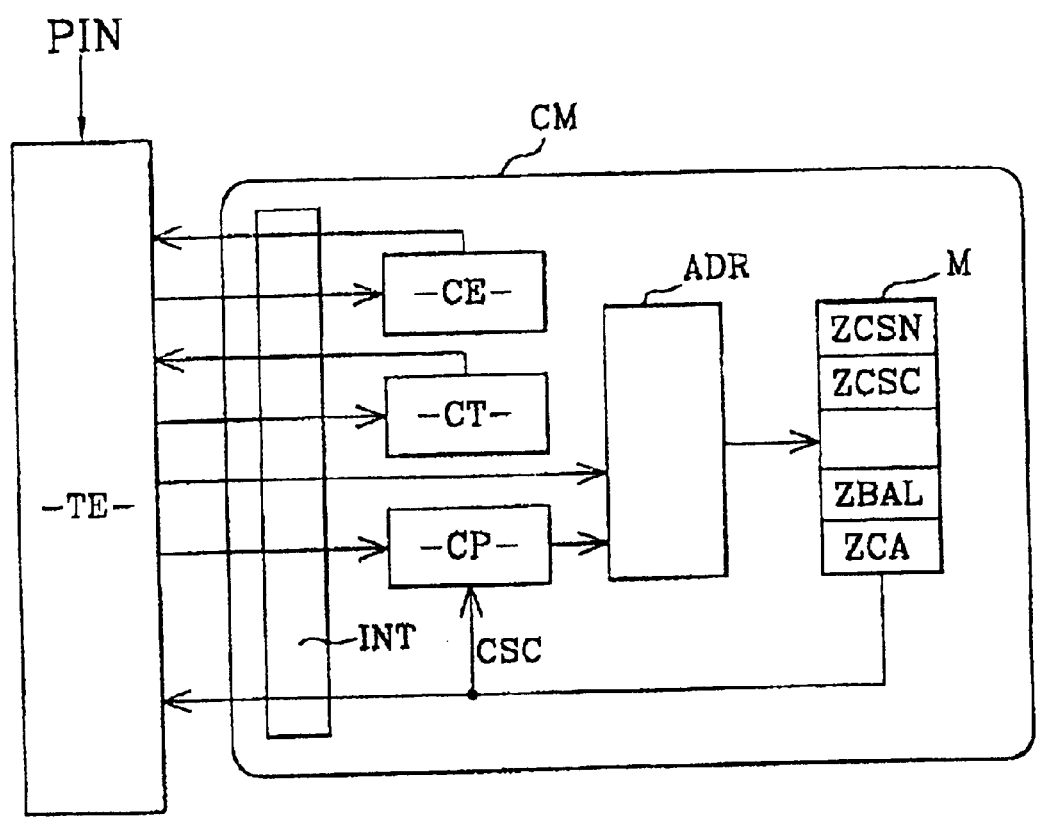
FIG. 1 is a simplified diagram of a memory chip card.
Figure 2:
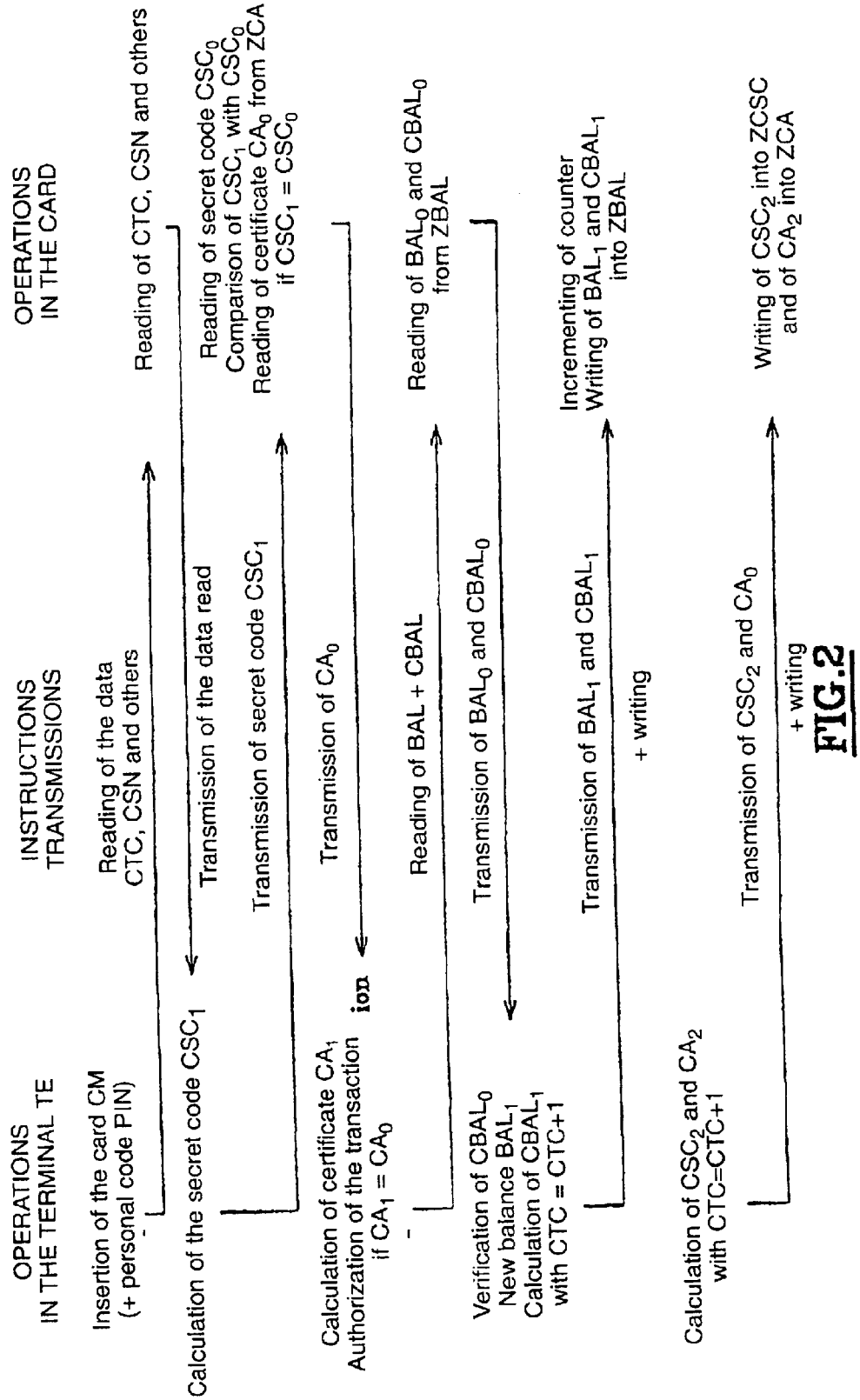
FIG. 2 is a chart showing the operations performed between the terminal and the memory chip card during a transaction.

The method of the invention applies (FIG. 1) to a memory chip card CM which of course comprises a memory M but also a so-called transaction counter CT which counts the transactions performed between the card CM and a terminal TE to which the card is connected by insertion.

The memory chip card CM can also comprise a second so-called authentication counter CE which counts the authentication requests, these authentication requests possibly occurring at any time during a transaction and independently thereof.

These two counters CE and CT can form part of the memory M according to known devices.

In addition, the memory M of the card comprises a first area with unprotected read access in which there is recorded, for example the serial number CSN of the card in a part ZCSN, and a second area with protected access for the rest of the memory, this second area having parts which are allocated to the recording of particular values such as an Authentication Certificate CA in the part ZCA and a balance BAL and its authentication certificate CBAL in the part ZBAL.

A third area ZCSC is reserved for the recording of a secret code CSC and its access for recording is subject to presentation of the secret code CSC.

The memory M is addressed by an addressing circuit ADR and the two-way transmission of signals between the terminal TE and the card CM takes place by means of an interface circuit INT.

Furthermore, the card comprises a comparator CP which compares the code CSC read from the part ZCSC with a code supplied by the terminal TE, the result of the comparison allowing or not allowing the addressing of the protected area of the memory M.

The method according to the invention will be described within the context of a mutual authentication between the card and the terminal using the transaction counter CT alone and so-called one-way cryptographic functions but the method of the invention can also apply to authentication of the terminal by the card alone, and to simultaneous use of the two counters CE and CT and cryptographic functions other than one-way ones. The various operations, notably cryptographic operations, can be carried out either in the terminal TE, or in a security module, or even in a remote device.

Preferably, the mutual authentication method according to the invention comprises the following steps consisting of:

(m) inserting the card CM into the terminal TE, this step possibly including the presentation of a personal code PIN of the card user, (n) calculating, in the terminal TE, a session key $Ks_1$ by:

($n_1$) reading the serial number CSN of the card CM, ($n_2$) reading the content $CTC_1$ of the transaction counter CT of the card CM, and ($n_3$) calculating a session key $Ks_1$ according to a one-way cryptographic function $F_{ks}$ such that:

$$Ks_1 = F_{ks}(K_m, CSN, CTC_1)$$

$K_m$ being a parent key recorded in the terminal TE, $F_{ks}$ being for example a function of the hashing type, (o) calculating, in the terminal TE, a secret code $CSC_1$ of the card using a cryptographic function F such that:

$$CSC_1 = F(Ks_1),$$

(p) authenticating the terminal TE by the card CM by:

($p_1$) transmitting the secret code $CSC_1$ to the card CM, ($p_2$) comparing, in the comparator CP, this secret code $CSC_1$ with a secret code $CSC_0$ recorded in the card CM at the end of the previous transaction with the card, and ($p_3$) authorizing the remainder of the operations if the comparison indicates the identity $CSC_0 = CSC_1$ or refusing same in the contrary case;

(q) calculating, in the terminal TE, an Authentication Certificate $CA_1$ such that:

$$CA_1 = G(Ks_1)$$

G being a cryptographic function, and (r) authenticating the card CM by the terminal TE by:

($r_1$) reading the content $CA_0$ of the area ZCA of the memory of the card CM, ($r_2$) transmitting, to the terminal TE, the content $CA_0$ of this protected area ZCA which corresponds to an Authentication Certificate $CA_0$ calculated at the end of the previous transaction, ($r_3$) comparing, in the terminal TE, the calculated Authentication Certificate $CA_1$ with the certificate $CA_0$, and ($r_4$) authorizing the remainder of the operations if the comparison indicates the identity $CA_1 = CA_0$;

(s) carrying out the transaction, this transaction possibly consisting for example of updating a memory area ZBAL indicating the state of the credit or balance BAL remaining in the card CM by:

($s_1$) reading, from the area ZBAL, the value $BAL_0$ of the balance resulting from the previous transaction and the corresponding certificate $CBAL_0$, ($s_2$) verifying that the certificate $CBAL_0$ correctly corresponds to the result of the cryptographic function such that:

$$CBAL_0 = H(K_t, BAL_0, CSN, CTC_1),$$

$K_t$ being a transaction key, ($s_3$) incrementing the transaction counter to the value $(CTC_1 + 1) = CTC_2$ ($s_4$) recording the new balance $BAL_1$ in the area ZBAL, ($s_5$) calculating a Certificate $CBAL_1$ for the new balance BAL1 such that:

$$CBAL_1 = H(K_t, BAL_1, CSN, CTC_2), \text{ and}$$

($s_6$) recording $CBAL_1$ in the area ZBAL;

(t) updating the card CM for the next transaction with a new secret code $CSC_2$ and a new certificate $CA_2$, by ($t_1$) calculating in the terminal TE:

the future session key $KB_2$ such that;

$$Ks_2 = F(K_m, CSN, CTC_2)$$

the future secret code $CSC_2$ such that:

$$CSC_2 = P(Ks_2),$$

the future authentication certificate $CA_2$ such that:

$$CA_2 = G(Ks_2),$$

($t_2$) recording the secret code $CSC_2$ in the memory M of the card CM in the protected area and the authentication certificate $CA_2$ in the protected area ZCA.

The invention has been described with a particular embodiment in which the transaction is an operation on the balance value of the card; however, the invention applies to any other transaction according to the applications provided for the card under consideration.

In this particular example, the transaction ends with an incrementing of the transaction counter CT to a value $CTC_2$ which is usually equal to $(CTC_1 + 1)$. However, this value of $CTC_2$ can be different from $(CTC_1 + 1)$ and be equal, for example, to $(CTC_1 + 3)$.

This transaction counter must be incremented or decremented at each transaction even if the operation leads to the balance not being changed; in this case, it is necessary to perform the transaction by re-recording the unchanged balance but the certificate $CBAL_1$ will be different since the transaction counter will have been incremented. The same will apply for the new secret code $CSC_2$ and the certificate $CA_2$.

The variables of the functions F, G and $F_{ks}$ which have been adopted in the example are the parent key, the serial number CSN and the value CTC of the transaction counter. However, additional variables can be used such as the personal code PIN of the card user, this code being entered into the terminal after insertion of the card.

The invention has been described within the context of a card/terminal mutual authentication but it applies more generally first to an authentication of the terminal by the card, this first authentication possibly being followed or not followed by an authentication of the card by the terminal, the set of these two authentications making a mutual authentication.

The example described uses cryptographic functions F, G and $F_{ks}$ using variables such as a parent key $K_m$, a session key $K_s$ and a transaction key $K_t$, but such keys are not necessary for implementing the invention.

The value of the authentication counter CE is preferably used for calculating the secret code CSN while the value of the transaction counter CT is preferably used for calculating the authentication certificate CA.

What is claimed is:

1. An authenticating method between a memory chip card having at least one counter and a terminal, comprising the following steps:
   (a) inserting the memory chip card into the terminal,
   (b) calculating, in the terminal, a secret code $CSC_1$, according to a cryptographic function F of a number of variables comprising at least a code CSN identifying the memory chip card and the value of said counter,
   (c) authenticating the terminal by the card when the calculated secret code $CSC_1$ is identical to a code $CSC_0$ recorded in a memory of the card at the end of a previous authentication operation,
   (d) carrying out a desired transaction and modifying the value of said counter,
   (e) calculating, in the terminal, a new secret code $CSC_2$ according to the cryptographic function F of the code CSN identifying the memory chip card and the new value of said counter,
   (f) updating the memory chip card for the next transaction by recording, in said memory, the new secret code $CSC_2$ calculated by the operation (e).

2. A method according to claim 1, further including the following steps between the steps (c) and (d):
   (x) calculating, in the terminal, an authentication certificate $CA_1$ according to a cryptographic function G of a number of variables comprising at least the code CSN identifying the memory chip card and the value of the counter,
   (y) authenticating the card by the terminal when the calculated authentication certificate $CA_1$ is identical to a certificate $CA_0$ calculated and recorded at the end of the previous transaction,
   and wherein step (e) is supplemented by the step of
   (e') calculating, in the terminal, a new authentication certificate $CA_2$ according to the cryptographic function G of the code CSN identifying the memory chip card and the new value of said counter,
   and wherein step (f) is supplemented by the step of
   (f') updating the memory chip card for the next transaction by recording, in the memory, the new authentication certificate $CA_2$ calculated according to the step (e').

3. A method according to claim 2 wherein step (b) comprises the following steps:
   first calculating, in the terminal, a session key $K_{s1}$ according to a cryptographic function $F_{ks}$ of a number of variables comprising at least a parent key $K_m$ known by the terminal, the code CSN identifying the memory chip card and the value of said counter,
   next calculating, in the terminal, the secret code $CSC_1$ according to the cryptographic function F of the session key $K_{s1}$,
   and wherein step (e) comprises:
   first calculating, in the terminal, a new session key $K_{s2}$ according to the cryptographic function $F_{ks}$ with the new value of said counter,
   next calculating, in the terminal, the new secret code $CSC_2$ according to the cryptographic function F of the new session key $K_{s2}$.

4. A method according to claim 3 wherein step (e') includes the step of calculating the new authentication certificate $CA_2$ according to the cryptographic function G of the new session key $K_{s2}$.

5. A method according to claim 1 wherein the memory chip card comprises two counters, one counting the authentications and the other counting payment transactions, and wherein the variables of the cryptographic functions comprise the values of said counters.

6. A method according to claim 1 wherein the cryptographic functions are one-way functions.

7. A method according to claim 6, wherein the cryptographic functions are "hashing" functions.

8. A method according to claim 3, wherein step (b) comprises the following steps:
   ($b_1$) reading the serial number CSN of the card,
   ($b_2$) reading the content of the counter, and
   ($b_3$) calculating the session key according to a cryptographic function $F_{ks}$ such that:
   $Ks_1 = F_{ks}(K_m, CSN, CTC_1)$.

9. A method according to claim 1, wherein step (c) comprises the following steps:
   ($c_1$) transmitting the secret code $CSC_1$ to the card,
   ($c_2$) comparing, in the card, this secret code $CSC_1$ with a secret code $CSC_0$ recorded in the card at the end of the previous transaction with the card, and
   ($C_3$) authorizing the remainder of the operations if the comparison indicates the identity $CSC_0 = CSC$, or refusing same if $CSC_0$ is not equal to $CSC_1$.

10. A method according to claim 2, wherein step (y) comprises the following steps:
    ($y_1$) reading the content $CA_0$ of a designated area of the memory of the card CM,
    ($y_2$) transmitting, to the terminal, the content $CA_0$ of said area which corresponds to an Authentication Certificate $CA_0$ calculated at the end of the previous transaction,
    ($Y_3$) comparing, in the terminal, the calculated Authentication Certificate $CA_1$ with the certificate $CA_0$, and
    ($y_4$) authorizing the remainder of the operations if the comparison indicates the identify $CA_1 = CA_0$.

11. A method according to claim 1, wherein step (d) comprises the following steps:
    ($d_1$) reading, from an area of the memory, the value $BAL_0$ of a balance resulting from the previous transaction and a corresponding certificate $CBAL_0$, and
    ($d_2$) verifying that the certificate $CBAL_0$ correctly corresponds to the result of the cryptographic function such that:
    $CBAL_0 = H(K_t, BAL_0, CSN, CTC_1)$,
    $K_t$ being a transaction key,
    ($d_3$) incrementing the transaction counter to the value $(CTC_1 + 1) = CTC_2$.
    ($d_4$) recording the new balance $BAL_1$ in said area,
    ($d_5$) calculating a Certificate $CBAL_1$ for the new balance $BAL_1$ such that:
    $CBAL_1 = H(K_t, BAL_1, CSN, CTC_2)$, and
    ($d_6$) recording $CBAL_1$ in said area.

12. A method according to claim 1 wherein step (a) also comprises a step of entering a personal code of the user.

13. A method according to claim 3, wherein in step (b), one of the variables used for calculating the session key $Ks_1$ is a personal code PIN of the user.

14. A method according to claim 1 wherein step (b) comprises the following steps:
    first calculating, in the terminal, a session key $K_{s1}$ according to a cryptographic function $F_{ks}$ of a number of variables comprising at least a parent key $K_m$ known by the terminal, the code CSN identifying the memory chip card and the value of said counter, next calculating, in the terminal, the secret code $CSC_1$ according to the cryptographic function F of the session key $K_{s1}$, and wherein step (e) comprises:

first calculating, in the terminal, a new session key $K_{s2}$ according to the cryptographic function $F_{ks}$ with the new value of said counter, next calculating, in the terminal, the new secret code $CSC_2$ according to the cryptographic function F of the new session key $K_{s2}$.

15. A method according to claim 14, wherein step (b) comprises the following steps:

($b_1$) reading the serial number CSN of the card, ($b_2$) reading the content of the counter, and ($b_3$) calculating the session key according to a cryptographic function $F_{ks}$ such that:

$Ks_1 = F_{ks}(K_m, CSN, CTC_1)$.

* * * * *